US012456561B2

(12) United States Patent
Tezuka et al.

(10) Patent No.: US 12,456,561 B2
(45) Date of Patent: Oct. 28, 2025

(54) ELECTROCONDUCTIVE FILM AND DISPLAY DEVICE

(71) Applicant: TDK Corporation, Tokyo (JP)

(72) Inventors: Kenichi Tezuka, Tokyo (JP); Mei Fukaya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/695,563

(22) PCT Filed: Sep. 29, 2022

(86) PCT No.: PCT/JP2022/036568

§ 371 (c)(1),
(2) Date: Mar. 26, 2024

(87) PCT Pub. No.: WO2023/054634

PCT Pub. Date: Apr. 6, 2023

(65) Prior Publication Data

US 2024/0412893 A1 Dec. 12, 2024

(30) Foreign Application Priority Data

Sep. 30, 2021 (JP) ................................ 2021-161773

(51) Int. Cl.
*H01B 5/16* (2006.01)

(52) U.S. Cl.
CPC ..................................... *H01B 5/16* (2013.01)

(58) Field of Classification Search
None
See application file for complete search history.

(56) References Cited

U.S. PATENT DOCUMENTS

2015/0138453 A1* 5/2015 Jang .................... G06F 3/04164
349/12
2020/0373653 A1 11/2020 Suzuki et al.

FOREIGN PATENT DOCUMENTS

JP 2000-138512 A 5/2000
JP 2008-270634 A 11/2008
WO 2019/107476 A1 6/2019

OTHER PUBLICATIONS https://en.wikipedia.org/wiki/Rectangle.*
Dec. 6, 2022 International Search Report issued in International Patent Application No. PCT/JP2022/036568.
Apr. 2, 2024 International Preliminary Report on Patentability issued in International Patent Application No. PCT/JP2022/036568.

* cited by examiner

*Primary Examiner* — Laura C Powers
(74) *Attorney, Agent, or Firm* — Oliff PLC

(57) ABSTRACT

A first electroconductive pattern includes a plurality of first electroconductive lines extending in a first direction along a main surface and a plurality of second electroconductive lines extending along the main surface in a second direction orthogonal to the first direction, each of a first pitch of the first mesh portion and a second pitch of the second mesh portion is smaller than a third pitch of the third mesh portion, a sum of the first pitch and the second pitch is greater than the third pitch, and in a case where a difference between the sum and the third pitch is assumed to be a fourth pitch, each of the first pitch and the second pitch is greater than the fourth pitch, and the first mesh portion and the second mesh portion are dissimilar in shape to the third mesh portion.

8 Claims, 7 Drawing Sheets

ELECTROCONDUCTIVE FILM AND DISPLAY DEVICE

TECHNICAL FIELD

The present disclosure relates to an electroconductive film and a display device.

BACKGROUND ART

Conventionally, an electroconductive film is known which includes a transparent substrate and a mesh-like electroconductive pattern disposed on a main surface of the transparent substrate (for example, Patent Literature 1). In the electroconductive film, the electroconductive pattern has a plurality of mesh portions formed by arranging electroconductive lines biaxially at a constant pitch.

CITATION LIST

Patent Literature

Patent Literature 1: Japanese Unexamined Patent Publication No. 2000-138512

SUMMARY OF INVENTION

Technical Problem

Here, in the electroconductive film as described above, a mesh portion having a pitch smaller than that of other mesh portions is sometimes formed at an end part of the electroconductive pattern. In that case, if the pitch of the mesh portion at the end part is too small, a distance between a pair of electroconductive lines facing each other in the mesh portion is too short. In this case, there is a possibility that the pair of electroconductive lines collapse or the like to be connected to each other during manufacturing or the like. The occurrence of such collapse forms a thick electroconductive line, which increases the visibility. In a case where the electroconductive film is incorporated in a display device, it is required to reduce the visibility of the electroconductive lines to a minimum.

To address this, an object of the present disclosure is to provide an electroconductive film capable of reducing the visibility of an electroconductive line, and a display device.

Solution to Problem

An electroconductive film according to one aspect of the present disclosure is an electroconductive film including: a film-like substrate; and a mesh-like first electroconductive pattern disposed on a main surface of the substrate, in which the first electroconductive pattern includes a plurality of first electroconductive lines extending in a first direction along the main surface and a plurality of second electroconductive lines extending along the main surface in a second direction orthogonal to the first direction, the first electroconductive pattern includes at least a first mesh portion arranged at an end part of the first electroconductive pattern in the second direction; a second mesh portion adjacent to the first mesh portion in the second direction; and a third mesh portion other than the first mesh portion and the second mesh portion, in the second direction, each of a first pitch of the first mesh portion and a second pitch of the second mesh portion is smaller than a third pitch of the third mesh portion, a sum of the first pitch and the second pitch is greater than the third pitch, and in a case where a difference between the sum and the third pitch is assumed to be a fourth pitch, each of the first pitch and the second pitch is greater than the fourth pitch, and the first mesh portion and the second mesh portion are dissimilar in shape to the third mesh portion.

A display device according to one aspect of the present disclosure includes the above-described electroconductive film.

Advantageous Effects of Invention

According to one aspect of the present disclosure, it is possible to provide an electroconductive film capable of reducing the visibility of an electroconductive line, and a display device.

DESCRIPTION OF EMBODIMENTS

Hereinafter, some embodiments of the present disclosure will be described in detail. However, the present disclosure is not limited to the following embodiments.

Figure 1:
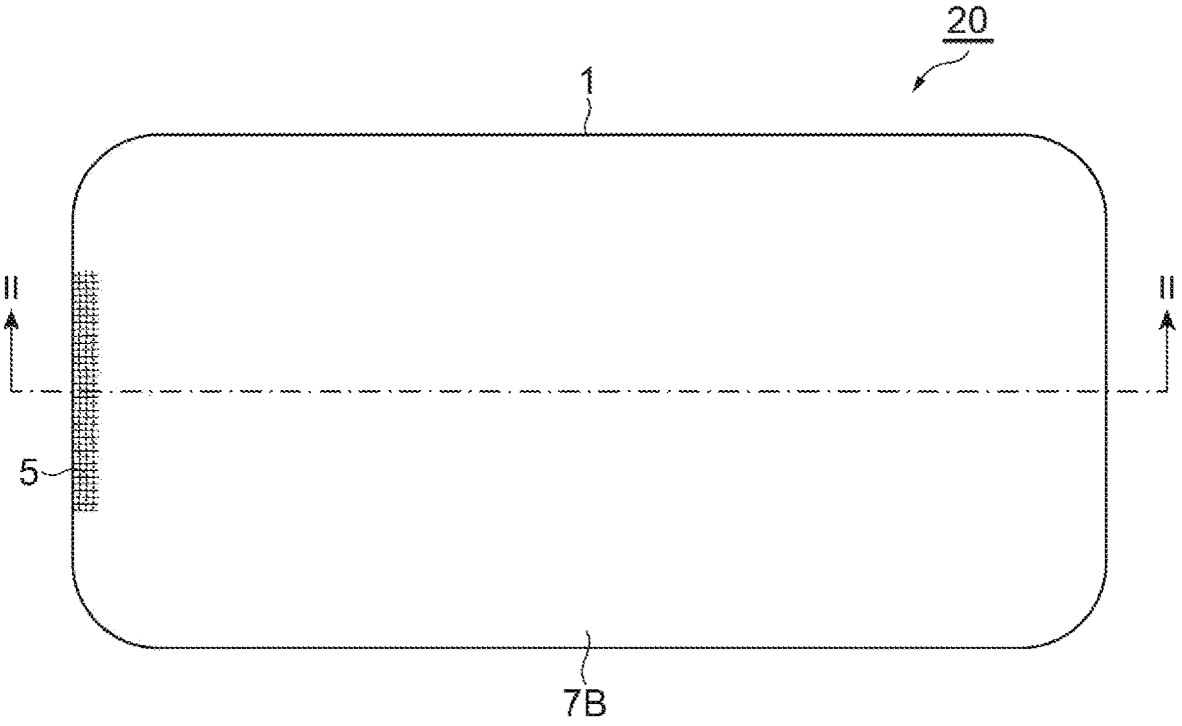
FIG. 1 is a plan view illustrating an embodiment of an electroconductive film.
Figure 2:
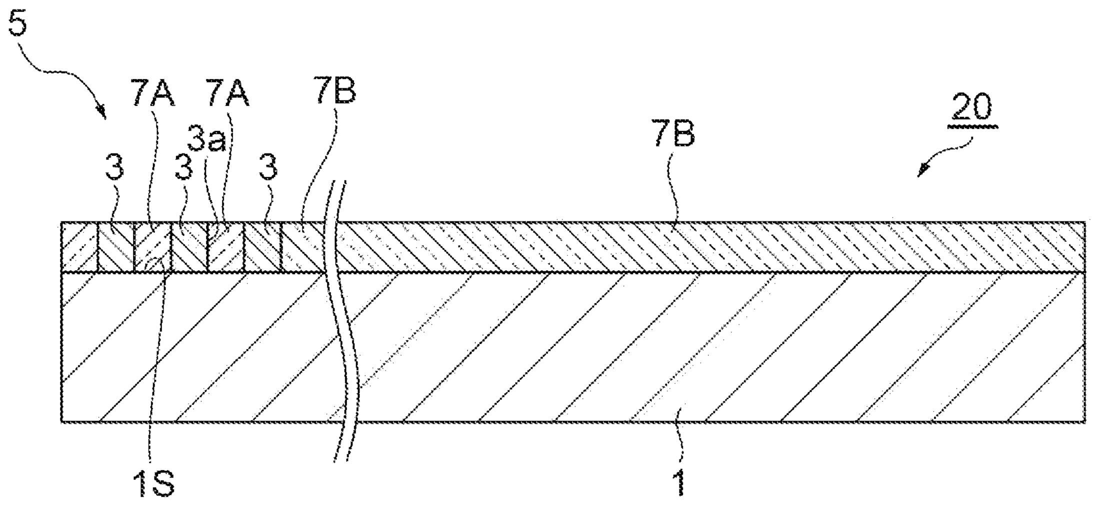
FIG. 2 is a cross-sectional view taken along the line II-II of FIG. 1.

FIG. 1 is a plan view illustrating an embodiment of an electroconductive film, and FIG. 2 is a cross-sectional view taken along the line II-II of FIG. 1. An electroconductive film 20 illustrated in FIGS. 1 and 2 includes a film-like light transmissive substrate 1 (substrate), an electroconductive layer 5 provided on one main surface 1S of the light transmissive substrate 1, and a light transmissive resin layer 7B provided on that one main surface 1S of the light transmissive substrate 1. The electroconductive layer 5 includes a conductor portion 3 that includes a part having a pattern extending in a direction along the main surface 1S of the light transmissive substrate 1 and including a plurality of openings 3*a*, and an insulating resin portion 7A filling the openings 3*a* of the conductor portion 3. In FIG. 2, the electroconductive layer 5 is illustrated in a deformed manner, and the width of the conductor portion 3 is illustrated in an emphasized manner. In the example illustrated in FIG. 1, the electroconductive layer 5 is formed near one short side of the electroconductive film 20, but the position where the electroconductive layer 5 is formed is not particularly limited, and the electroconductive layer 5 may be formed near a long side.

The light transmissive substrate 1 has light transmissivity to an extent required when the electroconductive film 20 is incorporated in a display device. Specifically, the total light transmittance of the light transmissive substrate 1 may be 90 to 100%. The light transmissive substrate 1 may have a haze of 0 to 5%.

The light transmissive substrate 1 may be, for example, a transparent resin film, and examples thereof include a film of polyethylene terephthalate (PET), polycarbonate (PC), polyethylene naphthalate (PEN), cycloolefin polymer (COP), or polyimide (PI). Alternatively, the light transmissive substrate 1 may be a glass substrate.

Figure 7:
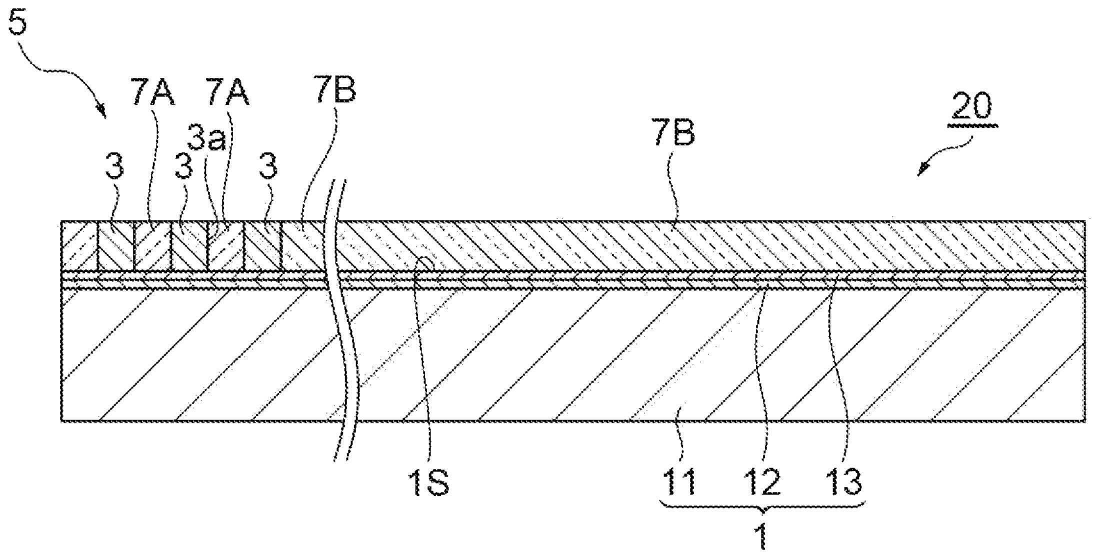
FIG. 7 is a cross-sectional view of an electroconductive film according to a modification.

For example, as illustrated in FIG. 7, the light transmissive substrate 1 may be a laminate including a light transmissive support film 11, and an intermediate resin layer 12 and an underlying layer 13 sequentially provided on the support film 11. The support film 11 can be the transparent resin film. The underlying layer 13 is a layer provided in order to form the conductor portion 3 by electroless plating or the like. In a case where the conductor portion 3 is formed by another method, the underlying layer 13 is not necessarily provided. It is not essential that the intermediate resin layer 12 is provided between the support film 11 and the underlying layer 13.

The thickness of the light transmissive substrate 1 or the support film 11 constituting the same may be 10 μm or more, 20 μm or more, or 35 μm or more, and may be 500 μm or less, 200 μm or less, or 100 μm or less.

Providing the intermediate resin layer 12 can improve adhesion between the support film 11 and the underlying layer 13. In a case where the underlying layer 13 is not provided, the intermediate resin layer 12 is provided between the support film 11 and the light transmissive resin layer 7B, so that adhesion between the support film 11 and the light transmissive resin layer 7B can be improved.

The intermediate resin layer 12 may be a layer containing a resin and an inorganic filler. Examples of the resin constituting the intermediate resin layer 12 include an acrylic resin. Examples of the inorganic filler include silica.

The thickness of the intermediate resin layer 12 may be, for example, 5 nm or more, 100 nm or more, or 200 nm or more, and may be 10 μm or less, 5 μm or less, or 2 μm or less.

The underlying layer 13 may be a layer containing a catalyst and a resin. The resin may be a cured product of a curable resin composition. Examples of a curable resin contained in the curable resin composition include an amino resin, a cyanate resin, an isocyanate resin, a polyimide resin, an epoxy resin, an oxetane resin, a polyester, an allyl resin, a phenolic resin, a benzoxazine resin, a xylene resin, a ketone resin, a furan resin, a COPNA resin, a silicon resin, a dicyclopentadiene resin, a benzocyclobutene resin, an episulfide resin, a thiol-ene resin, a polyazomethine resin, a polyvinyl benzyl ether compound, acenaphthylene, and an ultraviolet curable resin containing a functional group that causes a polymerization reaction with ultraviolet rays such as an unsaturated double bond, a cyclic ether, and a vinyl ether.

The catalyst contained in the underlying layer 13 may be an electroless plating catalyst. The electroless plating catalyst may be a metal selected from Pd, Cu, Ni, Co, Au, Ag, Pd, Rh, Pt, In, and Sn, or may be Pd. The catalyst may be one kind alone or a combination of two or more kinds. Usually, the catalyst is dispersed in the resin as catalyst particles.

The content of the catalyst in the underlying layer 13 may be 3 mass % or more, 4 mass % or more, or 5 mass % or more, and may be 50 mass % or less, 40 mass % or less, or 25 mass % or less with respect to the total amount of the underlying layer 13.

The thickness of the underlying layer 13 may be 10 nm or more, 20 nm or more, or 30 nm or more, and may be 500 nm or less, 300 nm or less, or 150 nm or less.

The light transmissive substrate 1 may further include a protective layer provided on a main surface of the support film 11 opposite to the light transmissive resin layer 7B and the conductor portion 3. Providing the protective layer prevents the support film 11 from being scratched. The protective layer can be a layer similar to the intermediate resin layer 12. The thickness of the protective layer may be 5 nm or more, 50 nm or more, or 500 nm or more, and may be 10 μm or less, 5 μm or less, or 2 μm or less.

The conductor portion 3 constituting the electroconductive layer 5 includes a part having a pattern including the openings 3*a*. The pattern including the openings 3*a* is a mesh-like pattern that is formed by a plurality of linear portions intersecting each other and includes the plurality of openings 3*a* regularly arranged. The conductor portion 3 having the mesh-like pattern can favorably function as, for example, a radiating element, a power supply portion, and a ground portion of an antenna. The configuration of the pattern of the electroconductive layer 5 in the electroconductive layer 5 will be detailed later. In addition to the part having the pattern including the openings 3*a*, the conductor portion 3 may have a part corresponding to an electroconductive member such as a ground terminal and a power supply terminal.

The conductor portion 3 may contain metal. The conductor portion 3 may contain at least one metal selected from copper, nickel, cobalt, palladium, silver, gold, platinum, and tin, or may contain copper. The conductor portion 3 may be metal plating formed by a plating method. The conductor portion 3 may further contain a nonmetallic element such as phosphorus within a range in which appropriate conductivity is maintained.

The conductor portion 3 may be a laminate including a plurality of layers. In addition, the conductor portion 3 may have a blackened layer as a surface layer portion on a side opposite to the light transmissive substrate 1. The blackened layer can contribute to improvement in visibility of a display device in which the electroconductive film is incorporated.

The insulating resin portion 7A is formed of a light transmissive resin and is provided so as to fill the openings 3*a* of the conductor portion 3, and the insulating resin portion 7A and the conductor portion 3 usually form a flat surface.

The light transmissive resin layer 7B is formed of a light transmissive resin. The total light transmittance of the light transmissive resin layer 7B may be 90 to 100%. The light transmissive resin layer 7B may have a haze of 0 to 5%.

The difference between the light transmissive substrate 1 (or the refractive index of the support film constituting the light transmissive substrate 1) and the refractive index of the light transmissive resin layer 7B may be 0.1 or less. As a result, good visibility of a display image is more easily achieved. The refractive index (nd 25) of the light transmissive resin layer 7B may be, for example, 1.0 or more, and may be 1.7 or less, 1.6 or less, or 1.5 or less. The refractive index can be measured by a spectroscopic ellipsometer. In terms of uniformity of the optical path length, the conductor portion 3, the insulating resin portion 7A, and the light transmissive resin layer 7B may have substantially the same thickness.

The resin forming the insulating resin portion 7A and the light transmissive resin layer 7B may be a cured product of a curable resin composition (photocurable resin composition or thermosetting resin composition). The curable resin composition forming the insulating resin portion 7A and/or the light transmissive resin layer 7B includes a curable resin, and examples thereof include an acrylic resin, an amino resin, a cyanate resin, an isocyanate resin, a polyimide resin, an epoxy resin, an oxetane resin, a polyester, an allyl resin, a phenolic resin, a benzoxazine resin, a xylene resin, a ketone resin, a furan resin, a COPNA resin, a silicon resin, a dicyclopentadiene resin, a benzocyclobutene resin, an episulfide resin, a thiol-ene resin, a polyazomethine resin, a polyvinyl benzyl ether compound, acenaphthylene, and an ultraviolet curable resin containing a functional group that causes a polymerization reaction with ultraviolet rays such as an unsaturated double bond, a cyclic ether, and a vinyl ether.

The resin forming the insulating resin portion 7A and the resin forming the light transmissive resin layer 7B may be the same. Since the insulating resin portion 7A and the light transmissive resin layer 7B formed of the same resin have the same refractive index, the uniformity of the optical path length transmitted through the electroconductive film 20 can be further improved. In a case where the resin forming the insulating resin portion 7A and the resin forming the light transmissive resin layer 7B are the same, for example, the insulating resin portion 7A and the light transmissive resin layer 7B can be easily and collectively formed by forming a pattern from one curable resin layer by an imprinting method or the like.

The electroconductive film 20 can be manufactured, for example, by a method including pattern formation by the imprinting method. An example of a method for manufacturing the electroconductive film 20 includes: preparing the light transmissive substrate 1 including the support film, the intermediate resin layer, and the underlying layer containing the catalyst, the intermediate resin layer, and the underlying layer being provided on one main surface of the support film; forming the curable resin layer on the main surface 1S on the underlying layer side of the light transmissive substrate 1; forming a trench in which the underlying layer is exposed by an imprinting method using a mold having a convex portion; and forming the conductor portion 3 filling the trench by an electroless plating method in which metal plating is grown from the underlying layer. The curable resin layer is cured in a state where the mold is pushed into the curable resin layer to thereby form collectively the insulating resin portion 7A having a pattern including an opening with an inverted shape of the convex portion of the mold, and the light transmissive resin layer 7B. The method for forming the insulating resin portion 7A having the pattern including the opening is not limited to the imprinting method, and any method such as photolithography can be applied.

Figure 3:
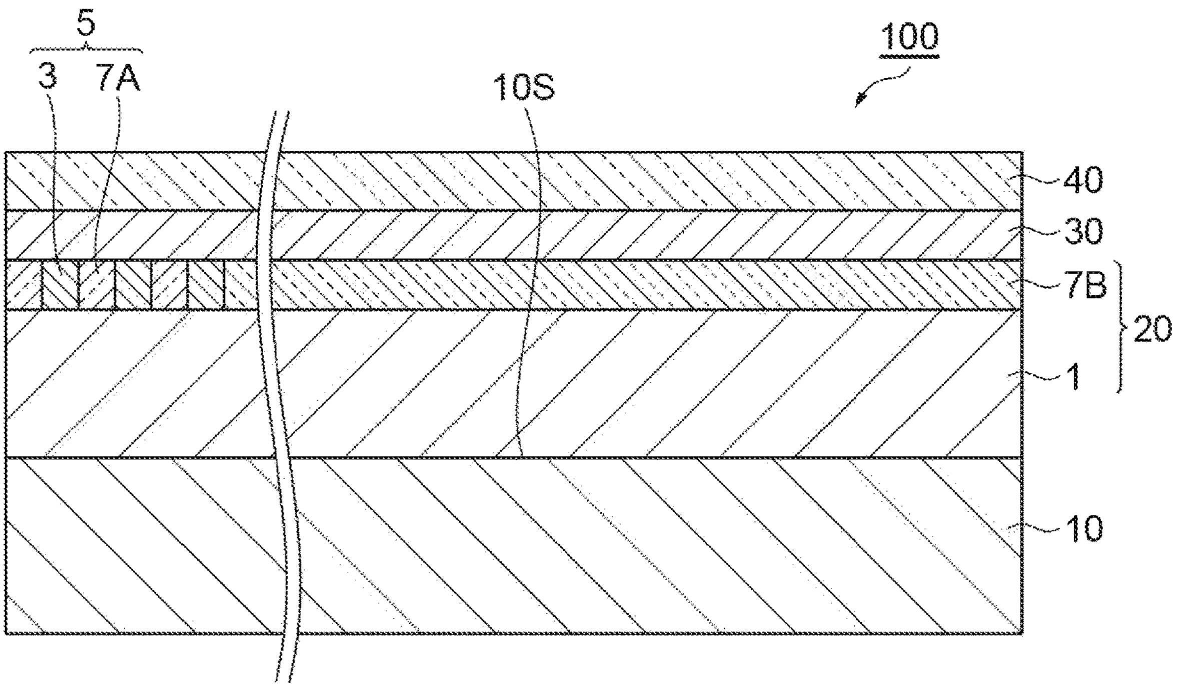
FIG. 3 is a cross-sectional view illustrating an embodiment of a display device.

The electroconductive film described above as an example can be incorporated into a display device as, for example, a planar transparent antenna. The display device may be, for example, a liquid crystal display device or an organic EL display device. FIG. 3 is a cross-sectional view illustrating an embodiment of a display device in which an electroconductive film is incorporated. A display device 100 illustrated in FIG. 3 includes an image display unit 10 having an image display region 10S, the electroconductive film 20, a polarizing plate 30, and a cover glass 40. The electroconductive film 20, the polarizing plate 30, and the cover glass 40 are laminated, in this order from the image display unit 10 side, on the image display region 10S side of the image display unit 10. The configuration of the display device is not limited to the form of FIG. 3, and can be appropriately changed as necessary. For example, the polarizing plate 30 may be provided between the image display unit 10 and the electroconductive film 20. The image display unit 10 may be, for example, a liquid crystal display unit. As the polarizing plate 30 and the cover glass 40, those commonly used in a display device can be used. The polarizing plate 30 and the cover glass 40 are not necessarily provided. Light for image display emitted from the image display region 10S of the image display unit 10 passes through a path having a highly uniform optical path length including the electroconductive film 20. This makes it possible to display an image with high uniformity and favorable quality with suppressed moire.

Figure 4:
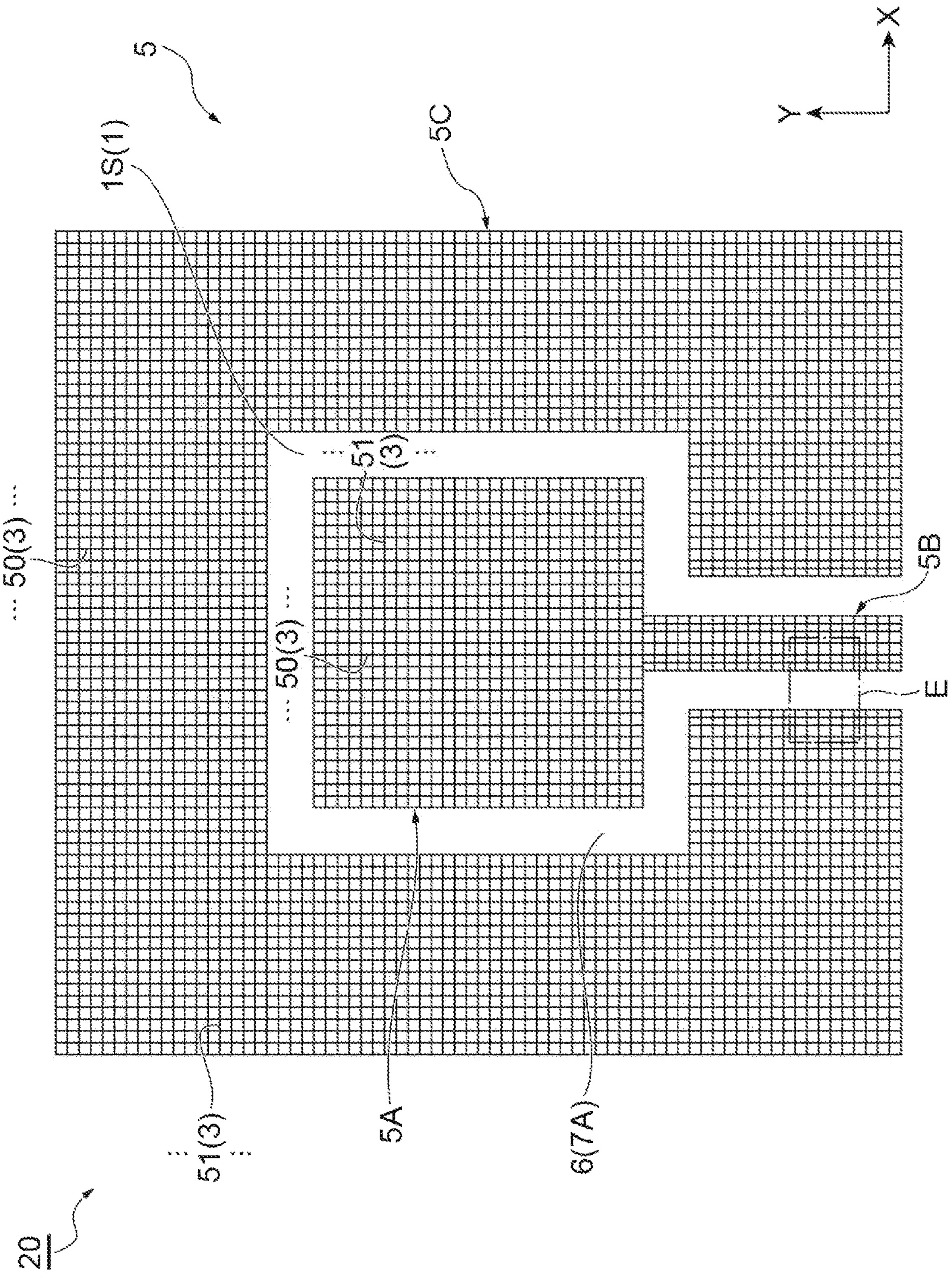
FIG. 4 is a plan view of an electroconductive layer.

Next, the configuration of the electroconductive layer 5 will be described in more detail with reference to FIG. 4. FIG. 4 is a plan view of the electroconductive layer 5. FIG. 4 is an enlarged view of a part of the electroconductive layer 5. In the following description, it is assumed that XY coordinates are set with respect to a plane parallel to the main surface 1S. The Y-axis direction (first direction) is a direction along the main surface 1S, and corresponds to a direction orthogonal to a side portion of the electroconductive film 20 in the example illustrated in FIG. 1. The center side of the electroconductive film 20 is defined as a positive side in the Y-axis direction, and the outer peripheral side of the electroconductive film 20 is defined as a negative side in the Y-axis direction. The X-axis direction (second direction) is a direction orthogonal to the Y-axis direction along the main surface S1, and corresponds to a direction in which the side portion of the electroconductive film 20 extends in the example illustrated in FIG. 1. One side in which the side portion of the electroconductive film 20 extends is defined as a positive side in the X-axis direction, and the other side is defined as a negative side in the X-axis direction.

As illustrated in FIG. 4, the mesh pattern of the electroconductive layer 5 includes a plurality of first electroconductive lines 50 and a plurality of second electroconductive lines 51. The first electroconductive line 50 is the linear conductor portion 3 extending parallel to the Y-axis direction. The plurality of first electroconductive lines 50 is arranged to be spaced apart from each other in the X-axis direction. The plurality of first electroconductive lines 50 is arranged to be spaced apart at a constant pitch except for a portion described later with reference to FIG. 5. The second electroconductive line 51 is the linear conductor portion 3 extending parallel to the X-axis direction. The plurality of second electroconductive lines 51 is arranged to be spaced apart from each other in the Y-axis direction. The plurality of second electroconductive lines 51 is arranged to be spaced apart at a constant pitch. The thickness of the electroconductive lines 50 and 51 is not particularly limited, and may be set to, for example, 1 to 3 μm. The pitch of the electroconductive lines 50 and 51 is not particularly limited, and may be set to, for example, 100 to 300 μm. The first electroconductive line 50 does not need to be parallel to the Y-axis direction as long as the first electroconductive line 50 extends in the Y-axis direction, and the second electroconductive line 51 does not need to be parallel to the X-axis direction as long as the second electroconductive line 51 extends in the X-axis direction.

The electroconductive layer 5 includes a radiating element portion 5A, a power supply portion 5B, and a ground portion 5C. The radiating element portion 5A is a region that radiates a signal as an antenna. The radiating element portion 5A has a square shape having two sides parallel to the Y-axis direction and two sides parallel to the X-axis direction. The power supply portion 5B is a region that feeds power to the radiating element portion 5A. The power supply portion 5B has a belt-like shape extending parallel to the Y-axis direction. The power supply portion 5B is connected to the side of the radiating element portion 5A on the negative side in the Y-axis direction. The power supply portion 5B is connected to a power supply terminal portion (not illustrated). The ground portion 5C is an electrically grounded region. The ground portion 5C is connected to a ground terminal (not illustrated). The ground portion 5C is formed so as to surround the radiating element portion 5A and the power supply portion 5B. A slit portion 6 in which no mesh is formed is provided between the ground portion 5C and each side of the radiating element portion 5A and between the ground portion 5C and each side of the power supply portion 5B. The insulating resin portion 7 is formed in the slit portion 6. This allows the ground portion 5C to be electrically insulated from the radiating element portion 5A and the power supply portion 5B.

Figure 5:
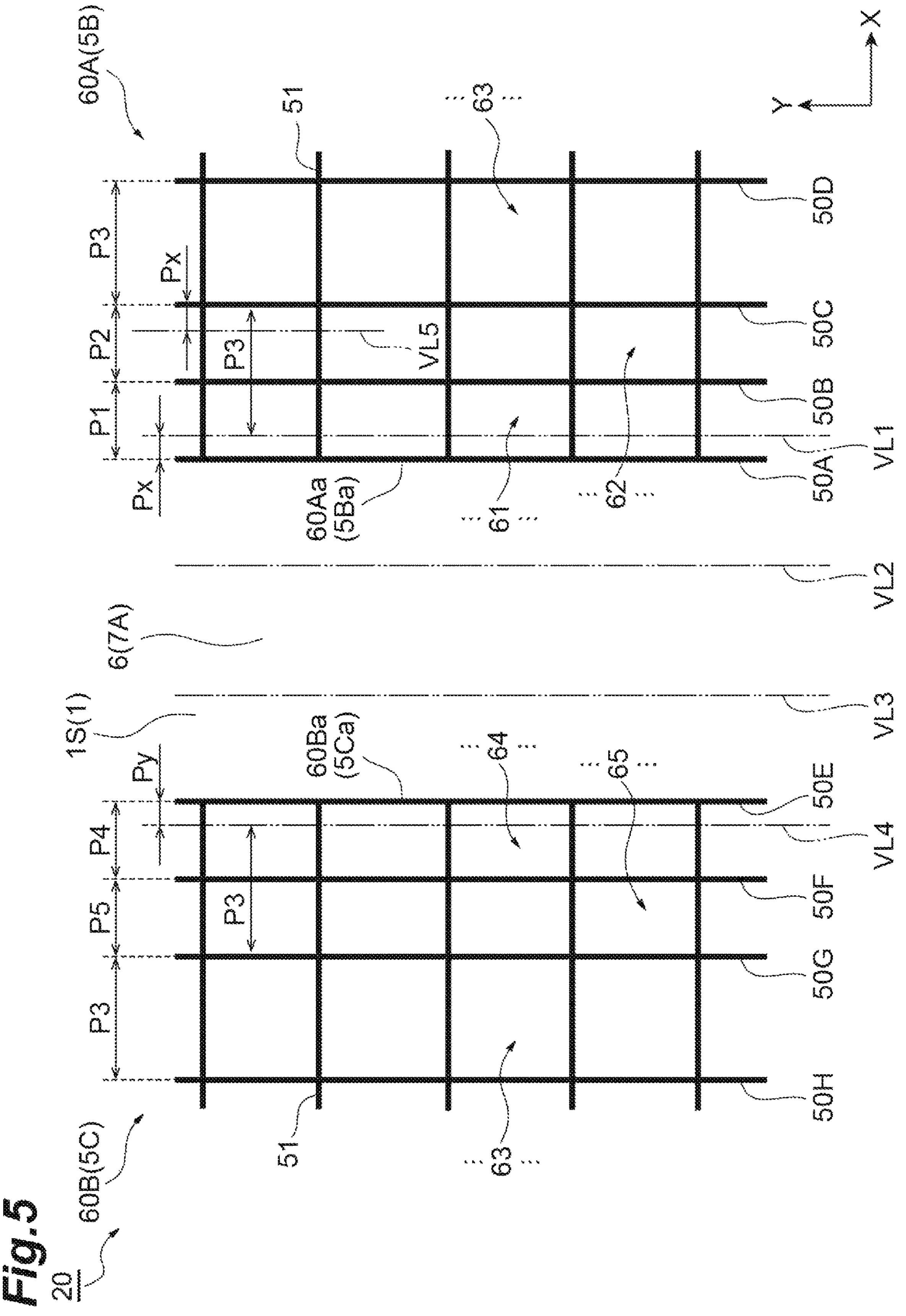
FIG. 5 is an enlarged view of a part indicated by "E" in FIG. 4.

Next, the pattern of the electroconductive layer 5 will be described in more detail with reference to FIG. 5. FIG. 5 is an enlarged view of a part indicated by "E" in FIG. 4. FIG. 5 is an enlarged view of the vicinity of an end part 5Ba of the power supply portion 5B on the negative side in the X-axis direction. Note that the ground portion 5C has an end part 5Ca facing the end part 5Ba of the power supply portion 5B via the slit portion 6. FIG. 5 is also an enlarged view of the vicinity of the end part 5Ca of the slit portion 6.

The electroconductive film 20 has a mesh-like first electroconductive pattern 60A and second electroconductive pattern 60B disposed on the main surface 1S of the light transmissive substrate 1. The first electroconductive pattern 60A and the second electroconductive pattern 60B are formed by the first electroconductive lines 50 and the second electroconductive lines 51. The first electroconductive pattern 60A is formed near the end part 5Ba of the power supply portion 5B on the negative side in the X-axis direction. The second electroconductive pattern 60B is formed near the end part 5Ca of the ground portion 5C. Therefore, the second electroconductive pattern 60B is disposed on the negative side of the X-axis so as to face the first electroconductive pattern 60A with a space from the first electroconductive pattern 60A. An end part 60Aa of the first electroconductive pattern 60A in the X-axis direction corresponds to the end part 5Ba of the power supply portion 5B. An end part 60Ba of the second electroconductive pattern 60B facing the first electroconductive pattern 60A corresponds to the end part 5Ca of the ground portion 5C.

In order to describe the configuration of the first electroconductive pattern 60A, the first electroconductive lines 50 of the first electroconductive pattern 60A may be identified as "first electroconductive lines 50A to 50D". The first electroconductive line 50 at the end part 60Aa of the first electroconductive pattern 60A is referred to as the "first electroconductive line 50A", and the first electroconductive lines 50 in the order of increasing distance from the slit portion 6 (in the order from the negative side toward the positive side in the X-axis direction) are referred to as the "first electroconductive line 50B", the "first electroconductive line 50C", and the "first electroconductive line 50D". Further, in order to describe the configuration of the second electroconductive pattern 60B, the first electroconductive lines 50 of the second electroconductive pattern 60B may be identified as "first electroconductive lines 50E to 50H". The first electroconductive line 50 at the end part 60Ba of the second electroconductive pattern 60B is referred to as the "first electroconductive line 50E", and the first electroconductive lines 50 in the order of increasing distance from the slit portion 6 (in the order from the positive side toward the negative side in the X-axis direction) are referred to as the "first electroconductive line 50F", the "first electroconductive line 50G", and the "first electroconductive line 50H". However, in a case where the first electroconductive lines are not distinguished, the first electroconductive line is simply referred to as the "first electroconductive line 50".

The first electroconductive pattern 60A includes a first mesh portion 61, a second mesh portion 62, and a third mesh portion 63. The second electroconductive pattern 60B includes a fourth mesh portion 64, a fifth mesh portion 65, and the third mesh portion 63. Each of the mesh portions 61 to 65 includes a pair of the first electroconductive lines 50 adjacent to and facing each other in the X-axis direction, and a pair of the second electroconductive lines 51 adjacent to and facing each other in the Y-axis direction. Further, an area of the region surrounded by a pair of the first electroconductive lines 50 and a pair of the second electroconductive lines 51 corresponds to an "opening area" of each of the mesh portions 61 to 65. As for each of the mesh portions 61 to 65, a plurality of the mesh portions is formed, at each position in the X-axis direction, so as to be arranged in the Y-axis direction.

The first mesh portion 61 of the first electroconductive pattern 60A is a mesh portion arranged at the end part 60Aa of the first electroconductive pattern 60A in the X-axis direction. The first mesh portion 61 has the first electroconductive line 50A, the first electroconductive line 50B, and a pair of the second electroconductive lines 51. The second mesh portion 62 is a mesh portion adjacent to the first mesh portion 61 on the positive side in the X-axis direction. The second mesh portion 62 has the first electroconductive line 50B, the first electroconductive line 50C, and a pair of the second electroconductive lines 51. The third mesh portion 63 is a mesh portion other than the first mesh portion 61 and the second mesh portion 62. The first mesh portion 61 and the second mesh portion 62 are also formed at an end part of the power supply portion 5B on the positive side in the X-axis direction. The third mesh portion 63 is formed over the entire power supply portion 5B and the entire radiating element portion 5A even in a part not illustrated in FIG. 5.

The fourth mesh portion 64 of the second electroconductive pattern 60B is a mesh portion arranged at the end part 60Ba facing the first electroconductive pattern 60A. The fourth mesh portion 64 has the first electroconductive line 50E, the first electroconductive line 50F, and a pair of the second electroconductive lines 51. The fifth mesh portion 65 is a mesh portion adjacent to the fourth mesh portion 61 on the negative side in the X-axis direction. The fifth mesh portion 65 has the first electroconductive line 50F, the first electroconductive line 50G, and a pair of the second electroconductive lines 51. The third mesh portion 63 is a mesh portion other than the fourth mesh portion 64 and the fifth mesh portion 65. The third mesh portion 63 of the second electroconductive pattern 60B has a configuration similar to that of the third mesh portion 63 of the first electroconductive pattern 60A. The fourth mesh portion 64 and the fifth mesh portion 65 are formed also at an end part of the ground portion 5C facing an end part of the power supply portion 5B on the positive side in the X-axis direction. The third mesh portion 63 is formed over the entire ground portion 5C even in a part not illustrated in FIG. 5.

Here, the dimension between the first electroconductive line 50C of the third mesh portion 63 of the power supply portion 5B and the first electroconductive line 50G of the third mesh portion 63 of the ground portion 5C is an integral multiple of a pitch P3 (third pitch) of the third mesh portion 63. In the present embodiment, the dimension between the first electroconductive line 50C and the first electroconductive line 50G is five times as long as the pitch P3. In FIG. 5, the first electroconductive lines 50 assumed to be formed at the pitch P3, which is a constant pitch, between the first electroconductive lines 50C and 50G are indicated by virtual lines VL1 to VL4. The virtual lines VL1 to VL4 are set in order from the first electroconductive line 50C. The first electroconductive line 50A at the end part 60Aa is arranged on the negative side in the X-axis direction with respect to the virtual line VL1. The first electroconductive line 50E at the end part 60Ba is arranged on the positive side in the X-axis direction with respect to the virtual line VL4. The pitch of the second electroconductive lines 51 in the Y-axis direction is equal to the pitch P3. Accordingly, the pitch of the mesh portions 61 to 65 in the Y-axis direction is equal to the pitch P3.

Next, the relationship between the sizes of the mesh portions 61, 62, and 63 of the first electroconductive pattern 60A and the relationship between the sizes of the mesh portions 64, 65, and 63 of the second electroconductive pattern 60B will be described.

In the X-axis direction, each of a pitch P1 (first pitch) of the first mesh portion 61 and a pitch P2 (second pitch) of the second mesh portion 62 is smaller than the pitch P3 of the third mesh portion 63. In addition, a difference between the pitch P3 and a sum of the pitch P1 and the pitch P2 is assumed to be a narrow pitch Px (fourth pitch). In that case, the sum of the pitch P1 and the pitch P2 is greater than the pitch P3, and each of the pitch P1 and the pitch P2 is greater than the narrow pitch Px.

Specifically, in the present embodiment, the pitch P1 is equal to the pitch P2. That is, the first electroconductive line 50B at the boundary between the first mesh portion 61 and the second mesh portion 62 is arranged at the center position, in the X-axis direction, between the first electroconductive line 50A of the end part 60Aa and the first electroconductive line 50C of the third mesh portion 63.

However, the position of the first electroconductive line 50B, that is, the relationship between the pitches P1 and P2 is not particularly limited. For example, a virtual line VL5 is set at a position which is away from the first electroconductive line 50C of the third mesh portion 63 toward the negative side in the X-axis direction by the narrow pitch Px. In this case, it is only required that the first electroconductive line 50B is arranged on the positive side in the X-axis direction with respect to the virtual line VL1 as well as on the negative side in the X-axis direction with respect to the virtual line VL5. That is, the relationship that the pitch P1 is greater than the narrow pitch Px and the pitch P2 is greater than the narrow pitch Px should hold.

Further, each of the opening area of the first mesh portion 61 and the opening area of the second mesh portion 62 may be equal to or larger than one half of the opening area of the third mesh portion 63. One of the opening area of the first mesh portion 61 and the opening area of the second mesh portion 62 may be equal to or larger than one half of the opening area of the third mesh portion 63.

The shape of each of the mesh portions 61 to 63 will be described. In the third mesh portion 63, both the pitches in the Y-axis direction and the X-axis direction are the pitch P3 and are identical. The third mesh portion 63 therefore has a square shape. On the other hand, the first mesh portion 61 and the second mesh portion 62 are dissimilar in shape to the third mesh portion 63. Specifically, the first mesh portion 61 and the second mesh portion 62 have a rectangular shape and are dissimilar in shape to the third mesh portion 63 having a square shape.

In the X-axis direction, each of a pitch P4 of the fourth mesh portion 61 and a pitch P5 of the fifth mesh portion 65 is smaller than the pitch P3 of the third mesh portion 63. In addition, a difference between the pitch P3 and a sum of the pitch P4 and the pitch P5 is assumed to be a narrow pitch Py. In that case, the sum of the pitch P4 and the pitch P5 is greater than the pitch P3, and each of the pitch P4 and the pitch P5 is greater than the narrow pitch Py. In the present embodiment, the pitch P4 is equal to the pitch P5. However, the relationship that the pitch P4 is greater than the narrow pitch Py and the pitch P5 is greater than the narrow pitch Py should hold. The fourth mesh portion 64 and the fifth mesh portion 65 are dissimilar in shape to the third mesh portion 63. Specifically, the fourth mesh portion 64 and the fifth mesh portion 65 have a rectangular shape and are dissimilar in shape to the third mesh portion 63 having a square shape. The narrow pitch Py may be equal to or different from the narrow pitch Px.

Further, a sum of the opening area of the fourth mesh portion 64 and the opening area of the first mesh portion 61 may be equal to or larger than the opening area of the third mesh. Each of the opening area of the fourth mesh portion 64 and the opening area of the fifth mesh portion 65 may be equal to or larger than one half of the opening area of the third mesh portion 63.

Next, functions and effects of the electroconductive film 20 and the display device 100 according to the present embodiment will be described.

According to the electroconductive film 20, the first mesh portion 61 of the end part 60Aa of the first electroconductive pattern 60A in the X-axis direction and the second mesh portion 62 adjacent thereto are dissimilar in shape to the third mesh portion 63. Further, in the X-axis direction, each of the pitch P1 of the first mesh portion 61 and the pitch P2 of the second mesh portion 62 is smaller than the pitch P3 of the third mesh portion 63. In such a structure, not only the first mesh portion 61 of the end part 60Aa but also the second mesh portion 62 has a pattern with a small pitch different from the constant pattern of the third mesh portion 63. Therefore, it is possible to apply adjustment for preventing the pitch from becoming too narrow in both the first mesh portion 61 and the second mesh portion 62.

Here, a difference between the pitch P3 and the sum of the pitch P1 and the pitch P2 is assumed to be the narrow pitch Px. The narrow pitch Px is equal to a narrow pitch of the mesh portion of the end part 60Aa in a case where it is assumed that the portion corresponding to the second mesh portion 62 is set to the pitch P3. That is, in FIG. 5, in a case where an electroconductive film in which the first electroconductive line 50B is arranged on the virtual line VL1 is assumed to be a comparative example, the pitch of the mesh portion of the end part 60Aa in the comparative example is equal to the narrow pitch Px. In this case, there is a possibility that a pair of the first electroconductive lines 50A and 50B collapse or the like to be connected to each other during manufacturing or the like. The occurrence of such collapse forms a thick electroconductive line, which increases the visibility.

In contrast, in the electroconductive film 20 according to the present embodiment, the sum of the pitch P1 and the pitch P2 is greater than the pitch P3, and each of the pitch P1 and the pitch P2 is greater than the narrow pitch Px. That is, in the first electroconductive pattern 60A, a pitch greater than the narrow narrow pitch Px can be achieved in the first mesh portion 61 and the second mesh portion 62. As a result, it is possible to prevent the visibility from being increased due to collapse of the first electroconductive lines 50A and 50B or the like at the end part 60Aa of the first electroconductive pattern 60A. As described above, the visibility of the electroconductive lines in the electroconductive film 20 can be reduced.

The first mesh portion 61 and the second mesh portion 62 may be rectangular. As a result, the first mesh portion 61 and the second mesh portion 62 can be formed to be dissimilar in shape to the third mesh portion 63 in a state where the first electroconductive line 50 is kept straight without having a special shape.

The pitch P1 may be equal to the pitch P2. In this case, both the pitch P1 and the pitch P2 can be widened to the same extent. This can prevent one of the pitches from becoming narrow.

Each of the opening area of the first mesh portion 61 and the opening area of the second mesh portion 62 may be equal to or larger than one half of the opening area of the third mesh portion 63. In this case, both the first mesh portion 61 and the second mesh portion 62 can be widened to the same extent. This can prevent a pitch of one of the mesh portions from becoming narrow.

The electroconductive film 20 may include the second electroconductive pattern 60B that is disposed so as to face the first electroconductive pattern 60A with a space from the first electroconductive pattern 60A in the X-axis direction, and is formed by the first electroconductive lines 50 and the second electroconductive lines 51, the second electroconductive pattern 60B may include the fourth mesh portion 64 arranged at the end part 60Ba facing the first electroconductive pattern 60A, and the sum of the opening area of the fourth mesh portion 64 and the opening area of the first mesh portion 61 may be equal to or larger than the opening area of the third mesh portion 63. In this case, it is possible to achieve a sufficient opening area in both the first mesh portion 61 that is the end part 60Aa of the first electroconductive pattern 60A and the fourth mesh portion 64 that is the end part 60Ba of the second electroconductive pattern 60B. As a result, it is possible to prevent the visibility from being increased due to collapse of the electroconductive lines or the like in each of the mesh portions 61 and 64.

The display device 100 according to the present embodiment includes the above-described electroconductive film 20.

According to the display device 100, functions and effects similar to those of the above-described electroconductive film 20 can be obtained.

The present disclosure is not limited to the above-described embodiments.

Figure 6:
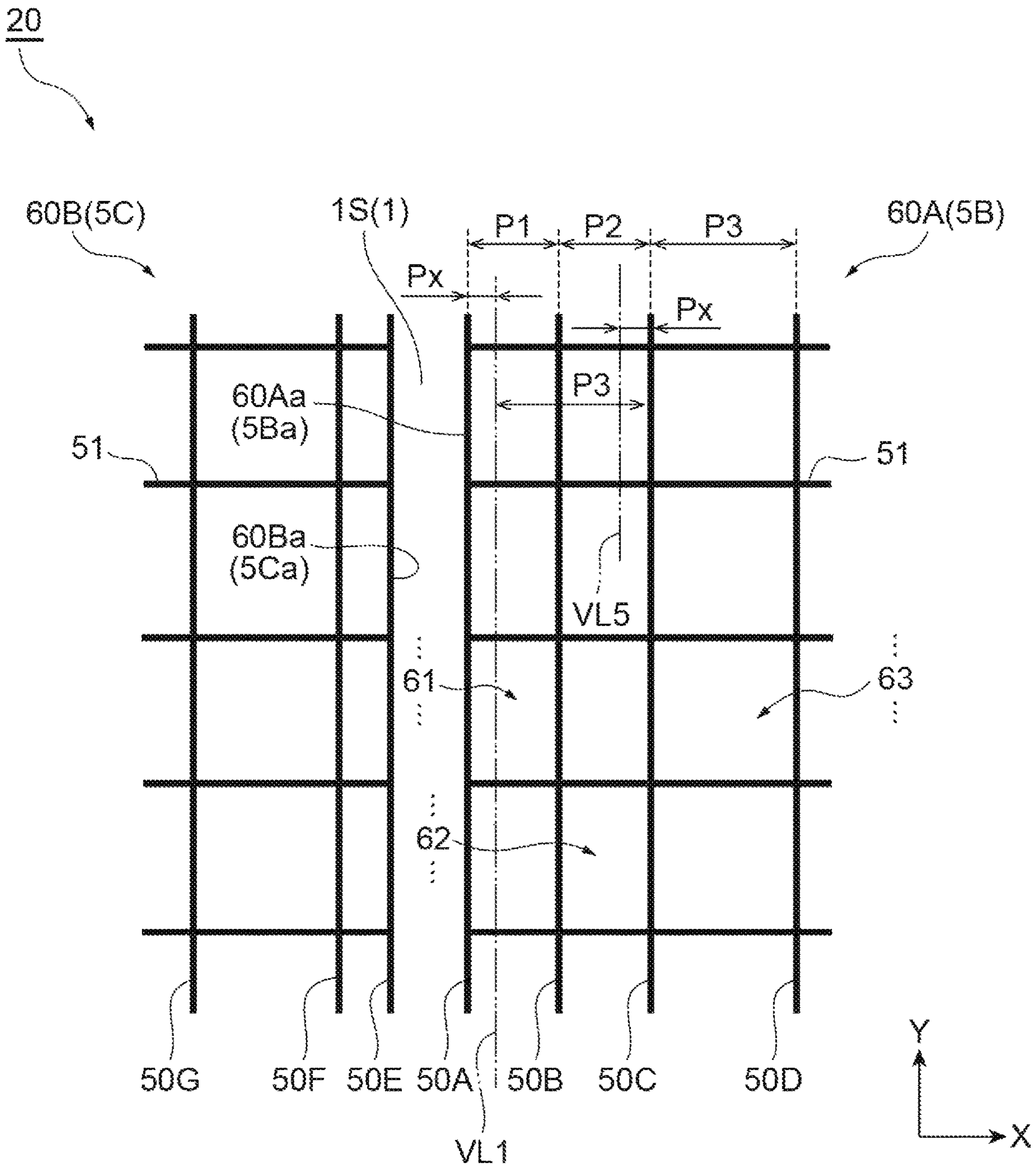
FIG. 6 is an enlarged view of an electroconductive layer of an electroconductive film according to a modification.

For example, the size of the width of the slit portion 6 is not particularly limited. For example, a configuration as illustrated in FIG. 6 may be adopted. In FIG. 6, the dimension between the virtual line VL1 and the first electroconductive line 50F is equal to the pitch P3 of one third mesh portion 63. Further, a mesh portion adjacent to the fourth mesh portion 64 at the end part 60Ba of the second electroconductive pattern 60B is the third mesh portion 63.

In the embodiments described above, the electroconductive pattern of the power supply portion 5B corresponds to the "first electroconductive pattern" in the claims, and the electroconductive pattern of the ground portion 5C corresponds to the "second electroconductive pattern" in the claims. However, which electroconductive pattern of the electroconductive film corresponds to the "first electroconductive pattern" and the "second electroconductive pattern" in the claims is not particularly limited. For example, the electroconductive pattern of the radiating element portion 5A may correspond to the "first electroconductive pattern" in the claims.

Further, the configuration illustrated in FIG. 4 is merely an example of the configuration of the electroconductive layer 5, and the shapes of the radiating element portion 5A, the power supply portion 5B, and the ground portion 5C may be appropriately changed.

FIG. 1 is merely an example of the overall configuration of the electroconductive film, and the electroconductive layer may be formed in any range and shape in the electroconductive film.

Although the display device has been exemplified as the device to which the electroconductive film is applied, the electroconductive film may be applied to other devices. For example, the electroconductive film may be applied to glass or the like of a building, an automobile, or the like.

The technique according to the present disclosure includes the following configuration examples, yet is not limited thereto.

An electroconductive film according to one aspect of the present disclosure is an electroconductive film including: a film-like substrate; and a mesh-like first electroconductive pattern disposed on a main surface of the substrate, in which the first electroconductive pattern includes a plurality of first electroconductive lines extending in a first direction along the main surface and a plurality of second electroconductive lines extending along the main surface in a second direction orthogonal to the first direction, the first electroconductive pattern includes at least a first mesh portion arranged at an end part of the first electroconductive pattern in the second direction; a second mesh portion adjacent to the first mesh portion in the second direction; and a third mesh portion other than the first mesh portion and the second mesh portion, in the second direction, each of a first pitch of the first mesh portion and a second pitch of the second mesh portion is smaller than a third pitch of the third mesh portion, a sum of the first pitch and the second pitch is greater than the third pitch, and in a case where a difference between the sum and the third pitch is assumed to be a fourth pitch, each of the first pitch and the second pitch is greater than the fourth pitch, and the first mesh portion and the second mesh portion are dissimilar in shape to the third mesh portion.

According to the electroconductive film, the first mesh portion of the end part of the first electroconductive pattern in the second direction and the second mesh portion adjacent thereto are dissimilar in shape to the third mesh portion. Further, in the second direction, each of the first pitch of the first mesh portion and the second pitch of the second mesh portion is smaller than the third pitch of the third mesh portion. In such a configuration, not only the first mesh portion of the end part but also the second mesh portion has a pattern with a small pitch different from the constant pattern of the third mesh portion. Therefore, it is possible to apply adjustment for preventing the pitch from becoming too narrow in both the first mesh portion and the second mesh portion. Here, a difference between the third pitch and a sum of the first pitch and the second pitch is assumed to be the fourth pitch. The fourth pitch is equal to a narrow pitch of the mesh portion of the end part in a case where it is assumed that the portion corresponding to the second mesh portion is set to the third pitch. On the other hand, the sum of the first pitch and the second pitch is greater than the third pitch, and each of the first pitch and the second pitch is greater than the fourth pitch. That is, in the first electroconductive pattern, a pitch greater than the narrow fourth pitch can be achieved in the first mesh portion and the second mesh portion. Accordingly, in the end parts of the first electroconductive pattern, it is possible to prevent the visibility from being increased due to collapse of the electroconductive line or the like. As described above, the visibility of the electroconductive lines in the electroconductive film can be reduced.

Further, the first mesh portion and the second mesh portion may be rectangular. As a result, the first mesh portion and the second mesh portion can be formed to be dissimilar in shape to the third mesh portion in a state where the first electroconductive line is kept straight without having a special shape.

The first pitch may also be equal to the second pitch. In this case, both the first pitch and the second pitch can be widened to the same extent. This can prevent one of the pitches from becoming narrow.

Further, each of the opening area of the first mesh portion and the opening area of the second mesh portion may be equal to or larger than one half of the opening area of the third mesh portion. In this case, both the first mesh portion and the second mesh portion can be widened to the same extent. This can prevent a pitch of one of the mesh portions from becoming narrow.

Further, the electroconductive film may include the second electroconductive pattern that is disposed so as to face the first electroconductive pattern with a space from the first electroconductive pattern in the second direction, and includes the first electroconductive lines and the second electroconductive lines, the second electroconductive pattern may include the fourth mesh portion arranged at the end part facing the first electroconductive pattern, and a sum of the opening area of the fourth mesh portion and the opening area of the first mesh portion may be equal to or larger than the opening area of the third mesh portion. In this case, it is possible to achieve a sufficient opening area in both the first mesh portion that is an end part of the first electroconductive pattern and the fourth mesh portion that is an end part of the second electroconductive pattern. As a result, it is possible to prevent the visibility from being increased due to collapse of the electroconductive lines or the like in each of the mesh portions.

A display device according to one aspect of the present disclosure includes the above-described electroconductive film.

According to the display device, functions and effects similar to those of the above-described electroconductive film can be obtained.

Embodiment 1

An electroconductive film including: a film-like substrate; and a mesh-like first electroconductive pattern disposed on a main surface of the substrate, in which the first electroconductive pattern includes a plurality of first electroconductive lines extending in a first direction along the main surface and a plurality of second electroconductive lines extending along the main surface in a second direction orthogonal to the first direction, the first electroconductive pattern includes at least a first mesh portion arranged at an end part of the first electroconductive pattern in the second direction;

a second mesh portion adjacent to the first mesh portion in the second direction; and a third mesh portion other than the first mesh portion and the second mesh portion, in the second direction, each of a first pitch of the first mesh portion and a second pitch of the second mesh portion is smaller than a third pitch of the third mesh portion, a sum of the first pitch and the second pitch is greater than the third pitch, and in a case where a difference between the sum and the third pitch is assumed to be a fourth pitch, each of the first pitch and the second pitch is greater than the fourth pitch, and the first mesh portion and the second mesh portion are dissimilar in shape to the third mesh portion.

Embodiment 2

The electroconductive film according to embodiment 1, in which the first mesh portion and the second mesh portion are rectangular.

Embodiment 3

The electroconductive film according to embodiment 1 or 2, in which the first pitch is equal to the second pitch.

Embodiment 4

The electroconductive film according to any one of embodiments 1 to 3, in which each of an opening area of the first mesh portion and an opening area of the second mesh portion is equal to or larger than one half of an opening area of the third mesh portion.

Embodiment 5

The electroconductive film according to any one of embodiments 1 to 4, including a second electroconductive pattern disposed so as to face the first electroconductive pattern with a space from the first electroconductive pattern in the second direction, the second electroconductive pattern including the first electroconductive line and the second electroconductive line, in which the second electroconductive pattern includes a fourth mesh portion arranged at an end part facing the first electroconductive pattern, and a sum of an opening area of the fourth mesh portion and an opening area of the first mesh portion is equal to or larger than an opening area of the third mesh portion.

Embodiment 6

A display device including the electroconductive film according to any one of embodiments 1 to 5.

REFERENCE SIGNS LIST

1 Light transmissive substrate (substrate)
1S Main surface of substrate
20 Electroconductive film
50 First electroconductive line
51 Second electroconductive line
60A First electroconductive pattern
60B Second electroconductive pattern
61 First mesh portion
62 Second mesh portion
63 Third mesh portion
64 Fourth mesh portion
100 Display device

The invention claimed is:

1. An electroconductive film comprising:

a substrate;

a first electroconductive pattern disposed on a main surface of the substrate; and a second electroconductive pattern, wherein the first electroconductive pattern includes a plurality of first electroconductive lines extending in a first direction along the main surface and a plurality of second electroconductive lines extending along the main surface in a second direction orthogonal to the first direction, the first electroconductive pattern includes at least a first mesh portion arranged at an end part of the first electroconductive pattern in the second direction;

a second mesh portion adjacent to the first mesh portion in the second direction; and a third mesh portion other than the first mesh portion and the second mesh portion, in the second direction, each of a first pitch of the first mesh portion and a second pitch of the second mesh portion is smaller than a third pitch of the third mesh portion, a sum of the first pitch and the second pitch is greater than the third pitch, and each of the first pitch and the second pitch is greater than a difference between the sum and the third pitch, the first mesh portion and the second mesh portion are dissimilar in shape to the third mesh portion, and the second electroconductive pattern is disposed so as to face the first electroconductive pattern with a space from the first electroconductive pattern in the second direction, and the first electroconductive pattern is electrically insulated from the second electroconductive pattern.

2. The electroconductive film according to claim 1, wherein the first mesh portion and the second mesh portion are rectangular.

3. The electroconductive film according to claim 1, wherein the first pitch is equal to the second pitch.

4. The electroconductive film according to claim 1, wherein each of an opening area of the first mesh portion and an opening area of the second mesh portion is equal to or larger than one half of an opening area of the third mesh portion.

5. The electroconductive film according to claim 1, wherein the second electroconductive pattern includes the first electroconductive line and the second electroconductive line, the second electroconductive pattern includes a fourth mesh portion arranged at an end part facing the first electroconductive pattern, and a sum of an opening area of the fourth mesh portion and an opening area of the first mesh portion is equal to or larger than an opening area of the third mesh portion.

6. A display device comprising the electroconductive film according to claim 1.

7. The electroconductive film according to claim 1, further comprising an insulating resin formed in the space between the first electroconductive pattern and the second electroconductive pattern.

8. The electroconductive film according to claim 1, wherein the second electroconductive pattern is part of an electrically grounded region that is connected to a ground terminal, and the first electroconductive pattern is part of a power supply region that is connected to a power supply terminal portion.

* * * * *